United States Patent
Tamura

(10) Patent No.: US 6,816,336 B2
(45) Date of Patent: Nov. 9, 2004

(54) MAGNETIC TAPE DRIVE HAVING A SENSOR FOR DETECTING A BEHAVIOR OF MAGNETIC TAPE AND A FLEXIBLE CIRCUIT BOARD CONNECTED TO THE SENSOR

(75) Inventor: Kazuya Tamura, Isehara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 64 days.

(21) Appl. No.: 10/236,187

(22) Filed: Sep. 6, 2002

(65) Prior Publication Data

US 2003/0048573 A1 Mar. 13, 2003

(30) Foreign Application Priority Data

Sep. 10, 2001 (JP) ........................................ 2001-273688

(51) Int. Cl.$^7$ ............................. G11B 15/00; G11B 5/08
(52) U.S. Cl. ......................................................... 360/93
(58) Field of Search ................................ 360/93, 261.3, 360/261, 264, 90, 91, 92, 94; 242/344

(56) References Cited

U.S. PATENT DOCUMENTS

| | | | |
|---|---|---|---|
| 4,587,584 A | * 5/1986 | Tutino | ........................ 360/96.3 |
| 5,259,563 A | * 11/1993 | Kakiwaki et al. | ........ 360/73.09 |
| 5,414,585 A | 5/1995 | Saliba | |
| 5,539,593 A | * 7/1996 | Kushiro et al. | ................ 360/85 |
| 5,793,574 A | 8/1998 | Cranson et al. | |
| 5,850,316 A | * 12/1998 | Sato et al. | ..................... 360/93 |
| 5,862,014 A | 1/1999 | Nute | |
| 6,078,483 A | * 6/2000 | Anderson | ................ 360/261.1 |
| 6,556,385 B2 | * 4/2003 | Nawa | ....................... 360/261.3 |
| 6,567,234 B2 | * 5/2003 | Matsuoka et al. | ......... 360/96.5 |

FOREIGN PATENT DOCUMENTS

| | | | | |
|---|---|---|---|---|
| JP | 06012736 A | * | 1/1994 | ......... G11B/15/093 |
| JP | 09127011 A | * | 5/1997 | .......... G01N/21/89 |
| JP | 2000-149491 A | | 5/2000 | |
| JP | 2002190191 A | * | 7/2002 | ........... G11B/33/12 |
| JP | 2002230864 A | * | 8/2002 | ........... G11B/15/60 |

* cited by examiner

Primary Examiner—George J. Letscher
Assistant Examiner—C R Magee
(74) Attorney, Agent, or Firm—Frishauf, Holtz, Goodman & Chick, P.C.

(57) ABSTRACT

In a magnetic tape drive including a magnetic head for accessing a magnetic tape traveling along a traveling path, a sensor is provided for detecting behavior of the magnetic tape. A flexible circuit board is connected to the sensor. A hook is disposed in the vicinity of the sensor. The circuit board is folded to form a curved portion between the circuit board and the hook.

9 Claims, 3 Drawing Sheets

MAGNETIC TAPE DRIVE HAVING A SENSOR FOR DETECTING A BEHAVIOR OF MAGNETIC TAPE AND A FLEXIBLE CIRCUIT BOARD CONNECTED TO THE SENSOR

BACKGROUND OF THE INVENTION

This invention relates to a magnetic tape drive such as a linear tape storage system represented by DLT (Digital Linear Tape) or LTO (Linear Tape Open).

A magnetic tape drive of the type has been developed as a backup for a computer system. A variety of magnetic tape drives have heretofore been proposed. For example, a digital linear tape drive as the DLT is disclosed in U.S. Pat. No. 5,862,014.

The digital linear tape drive is adapted to receive a tape cartridge having a single reel with a magnetic tape wound therearound, that is, a supply reel. The digital linear tape drive includes a take-up reel, a head guide assembly, and a magnetic head in the interior thereof. When the digital linear tape drive is driven, the magnetic tape is pulled out from the tape cartridge to be taken up around the take-up reel through the tape guide assembly. The tape guide assembly serves to guide the magnetic tape pulled out from the tape cartridge so that the magnetic tape moves along the magnetic head. The magnetic head serves to exchange information to and from the magnetic tape. The tape guide assembly is disclosed, for example, in U.S. Pat. No. 5,414,585.

As disclosed in U.S. Pat. No. 5,793,574 for example, a magnetic tape drive of the type comprises a substantially rectangular housing having a common base. The base has two spindle motors. The first spindle motor is connected to a take-up reel. The second spindle motor is connected to a supply reel of a removable tape cartridge.

The tape cartridge is inserted into a slot formed on the housing. Thereafter, the tape cartridge is manually or automatically mounted or located at a predetermined position of the magnetic tape drive. When the tape cartridge is mounted at the predetermined position, the supply reel of the tape cartridge is engaged with the second spindle motor. Prior to driving of the first and the second spindle motors, the magnetic tape is connected to the take-up reel by means of a mechanical buckling mechanism.

When the magnetic tape drive is driven, the magnetic tape streams at a relatively high speed. In order to guide the streaming of the magnetic tape, a plurality of guide rollers are disposed between the tape cartridge and the take-up spool or reel along the traveling path of the magnetic tape. One example of the tape cartridge is disclosed in Japanese Unexamined Patent Publication No. 2000-149491.

Since the magnetic tape streams at a relatively high speed, it is assumed that the magnetic tape has unfavorable behavior regarding each of a speed and a direction of movement thereof. Accordingly, it is desired to detect the behavior of the magnetic tape during the streaming thereof.

SUMMARY OF THE INVENTION

It is therefore an object of the present invention to provide a magnetic tape drive having a sensor for detecting behavior of a magnetic tape.

It is another object of the present invention to provide the magnetic tape drive of the type described, which has circuit board connected to the sensor.

It is still another object of the present invention to provide the magnetic tape drive of the type described, which is capable of preventing breakage of connection of the circuit board to the sensor.

It is yet another object of the present invention to provide the magnetic tape drive of the type described, in which trouble is reduced by simple modification in structure.

Other objects of the present invention will become clear as the description proceeds.

According to the present invention, there is provided a magnetic tape drive comprising a magnetic head for accessing a magnetic tape traveling along a traveling path in the magnetic tape drive, a sensor for detecting behavior of the magnetic tape at a first position, a flexible circuit board connected to the sensor, and a hook disposed in the vicinity of the sensor, the circuit board being folded to form a curved portion between the sensor and the hook.

DESCRIPTION OF THE PREFERRED EMBODIMENT

Figure 1:
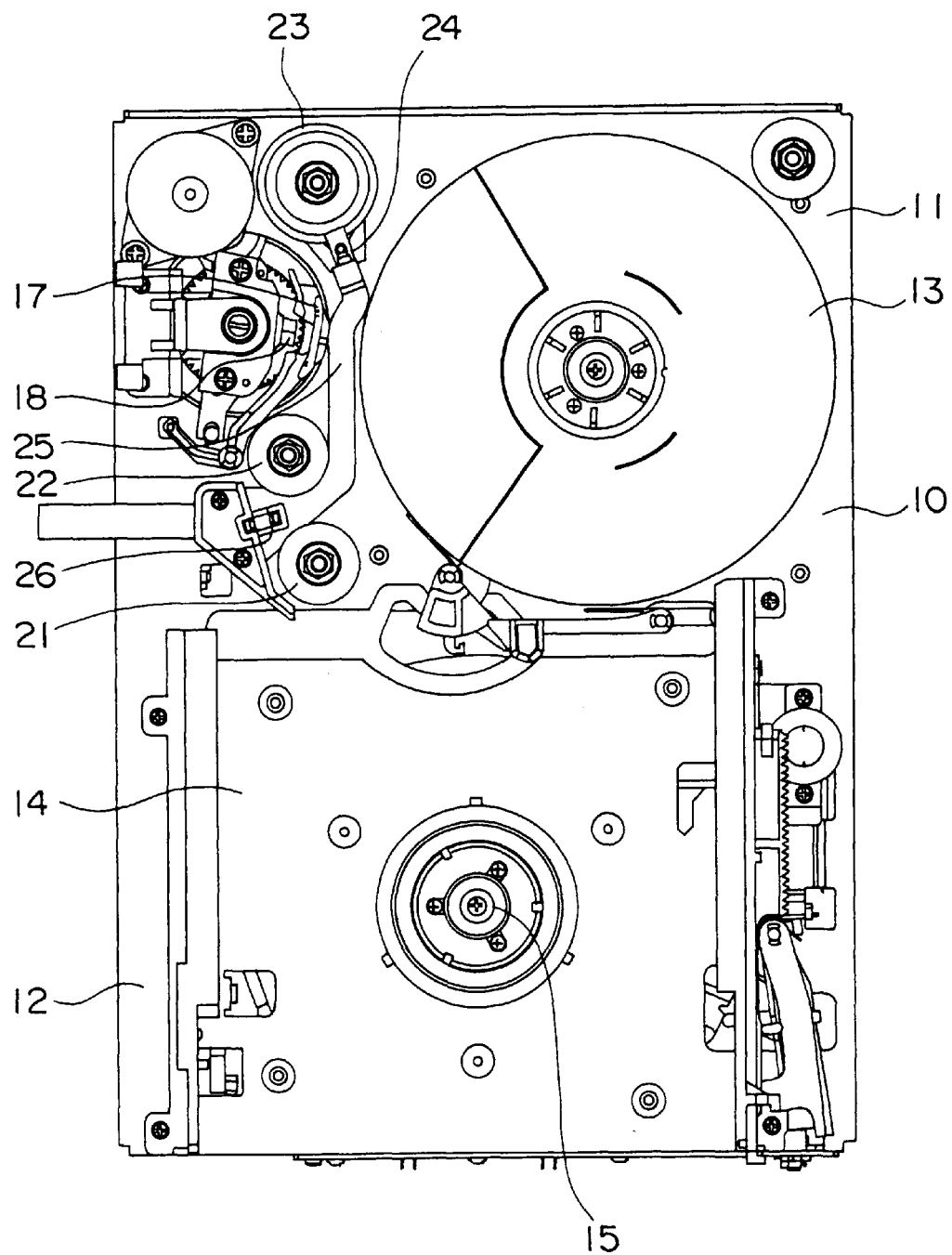
FIG. 1 is a plan view showing the internal structure of a magnetic tape drive according to an embodiment of the present invention.
Figure 2:
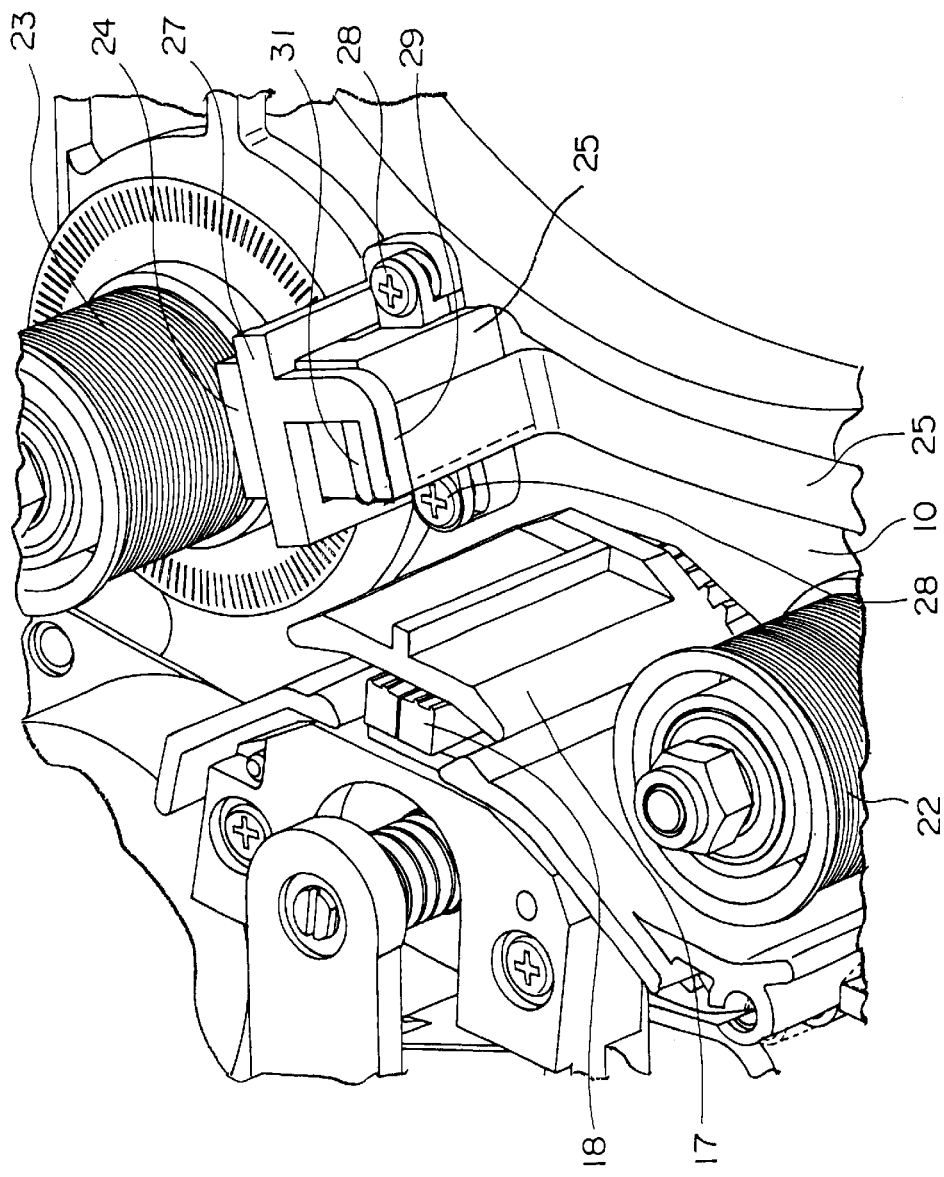
FIG. 2 is a perspective view showing a part of the magnetic tape drive in FIG. 1.

With reference to FIGS. 1 and 2, description will be made about a magnetic tape drive according to an embodiment of the present invention.

The magnetic tape drive illustrated in the figures is a magnetic recording and reproducing apparatus and comprises a chassis 10 disposed in the housing in a substantially horizontal position. The chassis 10 is made of an iron-based magnetic material and formed by sheet metal press. The chassis 10 has an upper surface which is divided into a first region 11 and a second region 12 adjacent to each other in the horizontal direction, for convenience of description.

In the first region 11, a take-up reel 13 is rotatably mounted. The take-up reel 13 is driven and rotated by a take-up motor (not shown) disposed on a lower surface of the chassis 10 when it is necessary.

In the second region 12, a slot portion 14 is formed. To the slot portion 14, a tape cartridge (not shown) is inserted and disposed. The tape cartridge is provided with a rotatable supply reel with the magnetic tape wound therearound. As the tape cartridge, use can be made of the one disclosed in Japanese Unexamined Patent Publication No. 2000-149491. When the tape cartridge is received in the slot portion 14, the supply reel of the tape cartridge is engaged, in its rotation direction, with a rotor 15 of the supply motor disposed on the lower surface of the chassis 10. Therefore, the supply reel can be driven and rotated when it is necessary.

Before the take-up reel 13 and the supply reel are driven and rotated, the magnetic tape is pulled out from the supply reel by means of a mechanical buckling mechanism (not shown) and connected to the take-up reel.

In the first region 11, a tape guide assembly 17 and a magnetic head 18 are disposed adjacent to the take-up reel 13. The tape guide assembly 17 serves to guide the magnetic tape pulled out from the tape cartridge so that the magnetic tape moves along the magnetic head 18. The magnetic head 18 serves to exchange information to and from the magnetic tape.

When the above-mentioned take-up motor and supply motor are driven, the magnetic tape streams or travels at a relatively high speed. In order to guide the streaming or the traveling of the magnetic tape, a plurality of guide rollers 21, 22, and 23 are disposed between the tape cartridge and the take-up reel 13 along a traveling path for the magnetic tape in the magnetic tape drive. In the above-described manner, the magnetic head 18 performs information exchange with the magnetic tape which is pulled out from the supply reel, stably streams or runs along the traveling path, and is wound around the take-up reel 13.

The magnetic tape drive being illustrated further comprises an optical sensor 24 disposed adjacent to the guide roller 23 in the vicinity of the magnetic head 18. The optical sensor 24 comprises a light-emitting element (not shown) and a light-receiving element (not shown) which are faced to each other via the magnetic tape and serves to detect behavior of the magnetic tape, that is, a speed and a direction of movement of the magnetic tape. In order to input or output a signal to or from the optical sensor 24, a flexible strip-like circuit board 25 is connected to the optical sensor 24 by soldering. The circuit board 25 is extended along the upper surface of the chassis 10.

In order to detect the behavior of the magnetic tape also between the guide rollers 21 and 22, an additional sensor 26 is provided on the upper surface of the chassis 10. The circuit board 25 is led to the vicinity of the additional sensor 26 along the traveling path of the magnetic tape and then extended out of the magnetic tape drive.

Figure 3:
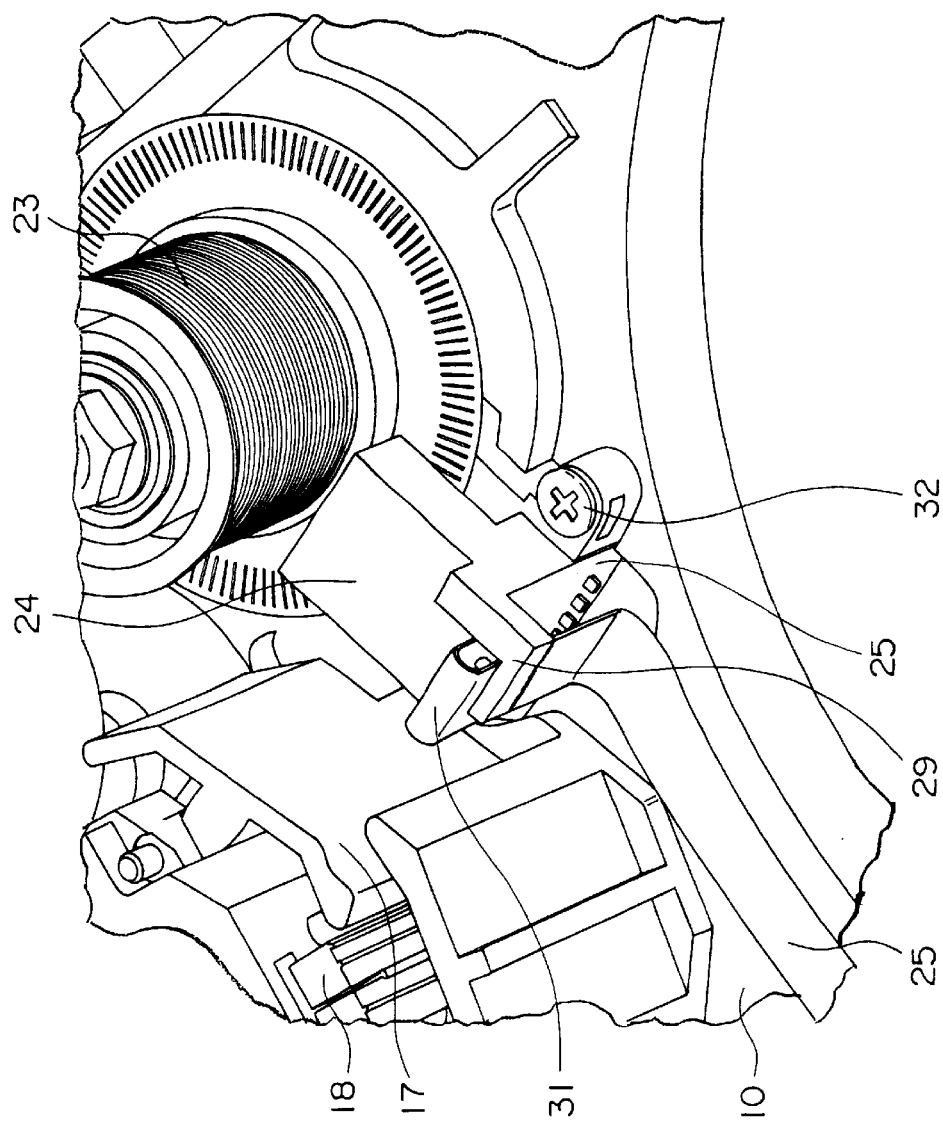
FIG. 3 is a perspective view showing a part of a modification of the magnetic tape drive in FIG. 1.

Particularly referring to FIG. 2, a bracket 27 is disposed in the vicinity of the optical sensor 24. The bracket 27 is fixed to the chassis 10, together with the optical sensor 24, by the use of a plurality of screws 28. The bracket 27 is provided with a hook 29 integrally formed therewith to be fixedly coupled thereto. The circuit board 25 has a folded structure. Specifically, the circuit board 25 has a curved portion 31 between the optical sensor 24 and the hook 29 and is folded at the curved portion 31. With this structure, no stress is applied to the soldering portion where the circuit board 25 is connected to the optical sensor 24. It is therefore possible to prevent the connection of the circuit board 25 from being broken or damaged. Without using the bracket 27, the hook 29 may be fixed and coupled directly to the optical sensor 24, as shown in FIG. 3. In this event, the optical sensor 24 is fixed to the chassis 10 by the use of a plurality of screws 32 (only one being illustrated). In this case also, the circuit board 25 has a folded structure having the curved portion 31 between the optical sensor 24 and the hook 29. With this structure also, no stress is applied to the soldering portion where the circuit board 25 is connected to the optical sensor 24. It is therefore possible to prevent the connection of the circuit board from being broken.

While the present invention has thus far been described in connection with a few embodiments thereof, it will readily be possible for those skilled in the art to put this invention into practice in various other manners. For example, the optical sensor may be replaced by sensors of other various types. In addition, although the description has been so far made about the magnetic tape drive with the chassis substantially disposed in a substantially horizontal position, the present invention is similarly applicable to a magnetic tape drive with a chassis disposed in a vertical or an oblique position.

What is claimed is:

1. A magnetic tape drive comprising:

a magnetic head for accessing a magnetic tape traveling along a traveling path defined in said magnetic tape drive;

a sensor for detecting behavior of said magnetic tape at a first position;

a flexible circuit board connected to said sensor; and a hook disposed in the vicinity of said sensor, said circuit board being folded to form a curved portion between said sensor and said hook.

2. The magnetic tape drive according to claim 1, further comprising a bracket disposed in the vicinity of said sensor and fixed to said sensor, said hook being coupled to said bracket.

3. The magnetic tape drive according to claim 1, wherein said hook is coupled directly to said sensor.

4. The magnetic tape drive according to claim 1, wherein said circuit board is connected to said sensor by soldering.

5. The magnetic tape drive according to claim 1, further comprising an additional sensor for detecting the behavior of said magnetic tape at a second position, said circuit board being led to the vicinity of said additional sensor along said traveling path.

6. The magnetic tape drive according to claim 1, further comprising a tape guide assembly for guiding said magnetic tape along said magnetic head.

7. The magnetic tape drive according to claim 6, further comprising:

a chassis having a first region and a second region adjacent to each other on its one surface;

a take-up reel disposed in said first region and driven and rotated; and a slot portion formed in said second region to receive a tape cartridge inserted therein, said tape guide assembly and said magnetic head being disposed in said first region to be adjacent to said take-up reel.

8. The magnetic tape drive according to claim 7, wherein said sensor, said circuit board, and said hook are disposed in said first region to be adjacent to said take-up reel.

9. The magnetic tape drive according to claim 1, wherein said sensor is an optical sensor and serves to detect, as the behavior, each of a speed and a direction of movement of said magnetic tape.

* * * * *

UNITED STATES PATENT AND TRADEMARK OFFICE
CERTIFICATE OF CORRECTION

| | |
|---|---|
| PATENT NO. | : 6,816,336 B2 |
| APPLICATION NO. | : 10/236187 |
| DATED | : November 9, 2004 |
| INVENTOR(S) | : Kazuya Tamura |

Page 1 of 1

It is certified that error appears in the above-identified patent and that said Letters Patent is hereby corrected as shown below:

Column 3, line 42, after "being broken or damaged.", start a new paragraph beginning with --Without using the bracket--.

Signed and Sealed this

Twenty-second Day of August, 2006

JON W. DUDAS
*Director of the United States Patent and Trademark Office*